United States Patent
McAuley (10) Patent No.: US 9,307,184 B2
(45) Date of Patent: Apr. 5, 2016

(54) MULTI-USER RECORDING ALLOCATION

(75) Inventor: Andrew McAuley, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 655 days.

(21) Appl. No.: 12/533,752

(22) Filed: Jul. 31, 2009

(65) Prior Publication Data

US 2011/0026904 A1    Feb. 3, 2011

(51) Int. Cl.
| | |
|---|---|
| H04N 5/76 | (2006.01) |
| H04N 21/433 | (2011.01) |
| H04N 21/4335 | (2011.01) |
| H04N 9/80 | (2006.01) |
| H04N 5/765 | (2006.01) |
| H04N 21/475 | (2011.01) |
| H04N 9/82 | (2006.01) |

(52) U.S. Cl.
CPC ............ *H04N 5/76* (2013.01); *H04N 21/4334* (2013.01); *H04N 21/4335* (2013.01); *H04N 21/4751* (2013.01); *H04N 5/765* (2013.01); *H04N 9/8205* (2013.01)

(58) Field of Classification Search
CPC . H04N 5/76; H04N 21/4334; H04N 21/4335; H04N 21/4751; H04N 5/765; H04N 9/8205
USPC .................................. 386/291–297; 725/134
See application file for complete search history.

(56) References Cited

U.S. PATENT DOCUMENTS

| | | | | |
|---|---|---|---|---|
| 6,564,005 | B1 * | 5/2003 | Berstis ........................... | 386/239 |
| 7,466,898 | B2 * | 12/2008 | Ohashi ........................... | 386/241 |
| 2003/0110488 | A1 * | 6/2003 | Lee ................................. | 725/30 |
| 2006/0136496 | A1 | 6/2006 | Ohashi | |
| 2006/0174309 | A1 * | 8/2006 | Pearson ......................... | 725/134 |
| 2007/0033232 | A1 * | 2/2007 | Malloy .......................... | 707/200 |
| 2008/0267591 | A1 * | 10/2008 | Wachtfogel et al. .......... | 386/124 |
| 2008/0282294 | A1 * | 11/2008 | Carpenter et al. .............. | 725/58 |
| 2009/0010618 | A1 * | 1/2009 | Devlin ........................... | 386/124 |
| 2009/0100478 | A1 * | 4/2009 | Craner et al. ................... | 725/87 |
| 2009/0165036 | A1 * | 6/2009 | Berry .............................. | 725/32 |

(Continued)

FOREIGN PATENT DOCUMENTS

| | | |
|---|---|---|
| KR | 10-2000-0053497 | 8/2000 |
| KR | 10-2008-0040572 | 5/2008 |
| WO | 00/04706 A2 | 1/2000 |
| WO | 2010/039254 A1 | 4/2010 |
| WO | 2011/070036 A1 | 6/2011 |

OTHER PUBLICATIONS

International Search Report and Written Opinion dated Mar. 1, 2011, PCT/US2010/042071, 9 pages.
Extended European Search Report dated Jun. 17, 2014, PCT/US2010042071, 8 pages.

*Primary Examiner* — Gelek W Topgyal
(74) *Attorney, Agent, or Firm* — Seed IP Law Group PLLC (57) ABSTRACT

Disclosed is an apparatus and method for allocating recordings to multiple users of a receiver. A graphical user interface may be displayed at a receiver and may show a listing of programs that have been recorded from a service provider broadcast or other transmission. An enhanced graphical user interface may include a listing of multiple users, each with separate listing of recordings. The recordings may be stored in a storage device associated with the receiver. A particular recoding may be deleted from the storage device when the recording has been deleted from each user's list of recordings.

15 Claims, 10 Drawing Sheets

(56) References Cited

U.S. PATENT DOCUMENTS

| | | | |
|---|---|---|---|
| 2009/0183222 A1* | 7/2009 | White et al. | 725/132 |
| 2010/0043023 A1* | 2/2010 | Austin et al. | 725/37 |
| 2010/0082681 A1* | 4/2010 | Adimatyam et al. | 707/784 |
| 2010/0086277 A1* | 4/2010 | Craner | 386/52 |
| 2010/0319026 A1* | 12/2010 | Ellis et al. | 725/40 |
| 2011/0135281 A1* | 6/2011 | Meare | 386/296 |
| 2013/0067519 A1* | 3/2013 | Yates | 725/47 |

* cited by examiner

MULTI-USER RECORDING ALLOCATION

TECHNICAL FIELD

Implementations discussed herein are generally directed to an apparatus and method for allocating recordings to a number of users.

BACKGROUND

Satellite or cable television receivers may include a recorder such as a digital video recorder (DVR) that is operable to record programs received through a program service transmission. Typically, these recorded programs are stored at the receiver and may be accessed through the operation of a graphical user interface or other mechanism which allows a user to select and play the stored videos. Due to space limitations that may be imposed by the capacity of a local storage device, it may be desirable to erase certain recordings so that the local storage device may be able to store new or more recently recorded programs. Deleting certain recorded programs may conflict with the needs of certain households which have one or more persons that use the satellite or cable television receiver. Specifically, a certain individual in the household may wish to delete a certain recording. However, he or she may not know whether or not the program has been saved for later viewing by another member of the household. Accordingly, recordings may tend to accumulate on the storage device due to uncertainty in the viewing habits of other members of the household.

SUMMARY

Embodiments discussed herein are directed to an apparatus and method for allocating recordings to multiple users of a receiver. A graphical user interface may be displayed at a receiver and may show a listing of programs that have been recorded from a service provider broadcast or other transmission. An enhanced graphical user interface may include a listing of multiple users, each with a separate listing of recordings. The recordings may be stored in a storage device associated with the receiver. A particular recoding may be deleted from the storage device when the recording has been deleted from each user's list of recordings.

One embodiment is directed to a method of recording programs received from a program service transmission in a receiver having at least a processor, a signal receiver and an output, the method comprising: receiving a first input through a signal receiver, the first input including a command to record a program from a program service transmission; receiving a second input through the signal receiver, the second input including a command to at least include the program in a first group of programs, the first group of programs being associated with a first user, the first user being one of a number of users associated with the receiver; in response to the first input, recording the program by a recorder when the program occurs, wherein the program is stored on a storage device as a recorded program; in response to the second input, adding, by a processor, the stored program to a first data set stored in the storage device, the first data set including all programs stored in the storage device that are in the first group, wherein the storage device includes at least a second data set, the second data set including all programs stored in the storage device that are in a second group associated with a second user, the second data set not including the stored program; and in response to a third input, outputting a signal comprising the first data set in a data stream for display on an output device, wherein the signal causes the output device to display a listing of the first group of programs.

Another embodiment is directed to a method of recording programs received from a program service transmission in a receiver having at least a processor, a signal receiver and an output, the method comprising: outputting a program signal to an output device, the program signal configured to cause the output device to display a stored program, wherein the stored program is recorded from a program service transmission; following a conclusion of program, deleting, by a processor the program from a first data set stored on a storage device, the storage device including at least the first data set and a second data set, the first data set including all programs stored in the storage device that are in a first group of programs associated with a first user, the second data set including all programs stored in the storage device that are in a second group of programs associated with a second user, the second group not including the program; and in response to an input from a signal receiver, outputting a signal comprising the first data set in a data stream for display on the output device, wherein the signal causes the output device to display a listing of the first group of programs.

Still another embodiment is directed to a system for managing programs recorded from a program service transmission, the system comprising: a receiver for receiving a program service transmission that includes a number of programs; a storage device interconnected with the receiver, the storage device configured to store programs recorded from the program service transmission as stored programs; a plurality of data structures stored on the storage device, each data structure containing a list of programs stored on the storage device that are associated with a particular user; an output device interconnected with the receiver and configured to display the programs stored in the storage device; wherein if a first program is deleted from each of the plurality of data structures, the first program is erased from the storage device.

DETAILED DESCRIPTION

Embodiments discussed herein are directed to an apparatus and method for allocating recordings to multiple users of a receiver. A graphical user interface may be displayed at a receiver and may show a listing of programs that have been recorded from a service provider broadcast or other transmission. An enhanced graphical user interface may include a listing of multiple users, each with separate listing of recordings. The recordings may be stored in a storage device associated with the receiver. A particular recoding may be deleted from the storage device when the recording has been deleted from each user's list of recordings.

As used herein, a "receiver" may be any device capable of receiving video content included in a broadcast or other program service transmission from a service provider. For example, a receiver may include a set-top box, a cable box, general purpose computer, and so on. A receiver may also include a cable modem or raster that receives streaming video. As used herein, a "service provider" may include any entity that provides a program service transmission to a receiver such as, without limitation, a satellite television distributor, a direct television provider or a cable television company. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example from a cable headend to cable receiver), an Internet or other computer-accessible medium (including a local area network, wide-area network, and so on), including Internet protocol television transmissions, a wireless network such as a radio frequency or infrared network, and so on.

Figure 1:
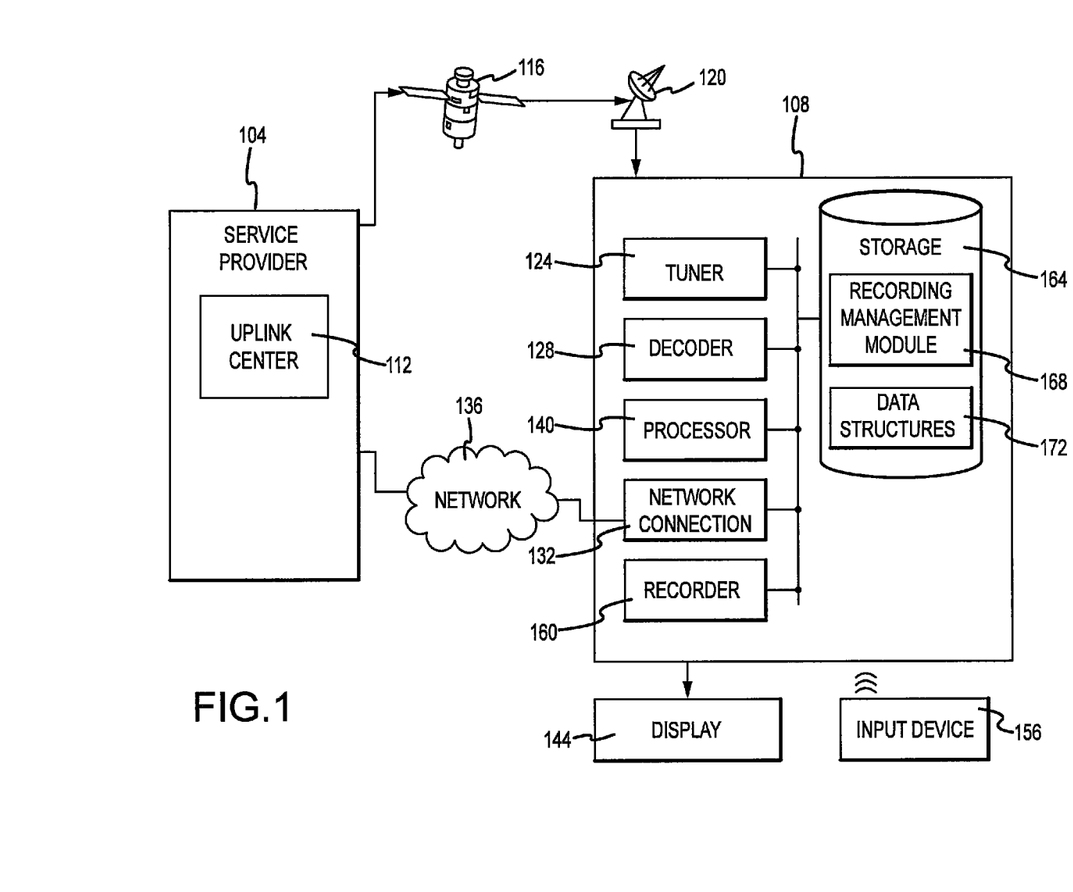
FIG. 1 is a schematic illustration of components and features used in connection with implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 may be associated with or located near an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements.

In connection with embodiments that operate in the context of a satellite television service, the service provider 104 may provide a program service transmission through an uplink center 112. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt or otherwise decode some or all of the received signal in accordance with purchases and selections made by a user.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks and/or the Internet. In such embodiments, the receiver 108 may be configured to access a web site, a file transfer protocol (FTP) site, a file sharing system or site, and so on.

A particular receiver 108 may include a network interface 132. The network interface 132 may be operable to communicate or send information across a network 136. In accordance with certain embodiments discussed herein, the network interface 132 may take the form of a modem network interface card, cable plug or jack, and so on. Using the interface, the receiver may communicate over a network 136 such as the public switched telephone network (PSTN). However, it should be appreciated that the network 136 may be any type of network capable of data communication, such as, for example, a local or wide area network or the Internet. The receiver 108 may communicate through the network connection 132 using any suitable communication protocol such as TCP/IP. Through the network interface 132, a user may communicate with the service provider 104 to change his or her account status including taking such actions as adding or canceling channels and/or ordering pay-per-view content.

The receiver 108 may additionally include a processor 140 operable to run executable code in connection with various functions associated with the receiver 108. For example, the processor 140 may display graphics, images, animations or other content on a display 144, such as a television (TV) or monitor. In the case of receiving commands or other information relating to changes to the account status, the processor 140 may be further operable to initiate or facilitate transmission of one or more messages to the service provider 104. The processor 140 may be further operable to recall and display stored content, such as a purchased or recorded videos or programs.

Among other functions, the processor 140 may also receive, store and/or display an Electronic Program Guide (EPG), which may provide a schedule of program content and/or other features. As used herein, the terms "electronic programming guide" or "EPG" are intended to encompass an interface that includes a schedule of programming content provided to a user as part of a program service transmission system. The EPG may comprise a database or may otherwise access a database containing information including, for example, names or titles of viewing events (programs), corresponding channel numbers and names, brief descriptions of the programs, start and finish times, and rating and content information related to the events. The EPG data 152 may complied at the service provider 104 and transmitted to the receiver 108. The processor 140 may access stored EPG data 152 and provide a formatted graphic output on the display 144. The formatted graphic output may include a button, timer or other mechanism configured to cause a program to be recorded. In connection with recording a particular program, the user may be prompted to indicate one or more user recording lists that should contain the recorded program.

The processor 140 may perform such tasks as executing commands received from a user. User commands may be sent to the receiver 108 through a user input device 156 such as remote or other wireless device. As used herein, a "user input device" may include any device operable to receive input from a user and to convey the input to the receiver 108. In one embodiment, the user input device 156 may be a hand-held device having a number of buttons or keys that when actuated by a user cause the user input device 156 covey information to the receiver 108 using a suitable communication means, such as an infrared signal. The user input device 156 may include a pointing device or functionality that allows the user to control the position of a cursor that is displayed on the display 144. For example, the user input device 156 may include a track ball or glide plane that may be manipulated to control cursor movements. The user input device 156 may include a motion sensor or accelerometer that allows a user to control displayed items or graphics, such as a cursor, through movements of his or her hand or arm that cause a displacement of the user input device 156. It should be appreciated that other input devices such as a computer mouse or touch screen may be used and other communication means, wired or wireless, may be used. Information sent to the receiver 108 may include, for example, a command to change the displayed channel, a command to pause and/or rewind a displayed program, a command to record a particular program, a command to purchase a pay-per-view item, a command to display an EPG and/or a command to navigate through the EPG. Commands sent to the receiver 108 may be entered through a dedicated display menu.

The receiver 108 may include or be associated with a recorder 160, such has a digital video recorder (DVR). The recorder 160 may be integrated into the receiver 108 or may be a stand alone device. The recorder 160 may be operated by a user who programs the device or receiver function to record a particular program at a specified time. When the program occurs, the recorder 160 will record and store the program, which can then be viewed later. In addition to this functionality, the recorder 160 may buffer a certain amount of content during a live transmission. Buffering a live transmission allows a user to pause and/or rewind the content of the transmission and to then display the content in a non-live or delayed manner. When the user programs the recorder 160 to record a particular program, he or she may additionally specify that the recording should be listed on one or more user recording lists.

The receiver 108 may include or be associated with a memory or other storage device 164, such as magnetic or optical storage. The storage device 164 may be operable to store data received from the decoded satellite signal. The storage device 164 may be volatile or non-volatile memory implemented using any suitable technique or technology such as, for example, random access memory (RAM), disk storage, flash memory, solid state and so on. The storage device 164 may be located within the receiver 108 or separately from the receiver 108. The storage device may removable in nature. The stored data set may include audio and/or visual content to be transmitted and displayed through the display 144. Generally, audio visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video. As a result commands or setting from a user, videos or other program may be stored locally in storage 164. Stored program may include for example recorded broadcasts, pay-per-view items and/or buffered portions of a live video broadcast.

The storage device 164 may additionally store an application, file, module or other data that is useable by the processor 140. In one instance, the stored application may be executed by the processor 140 to display and manage recording that are allocated to a number of users. As used herein, an application or module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor. An example of a module stored on the storage device is the recoding management module 148. The operation of the display module 148 will now be described with reference to FIGS. 2-10.

Figure 2:
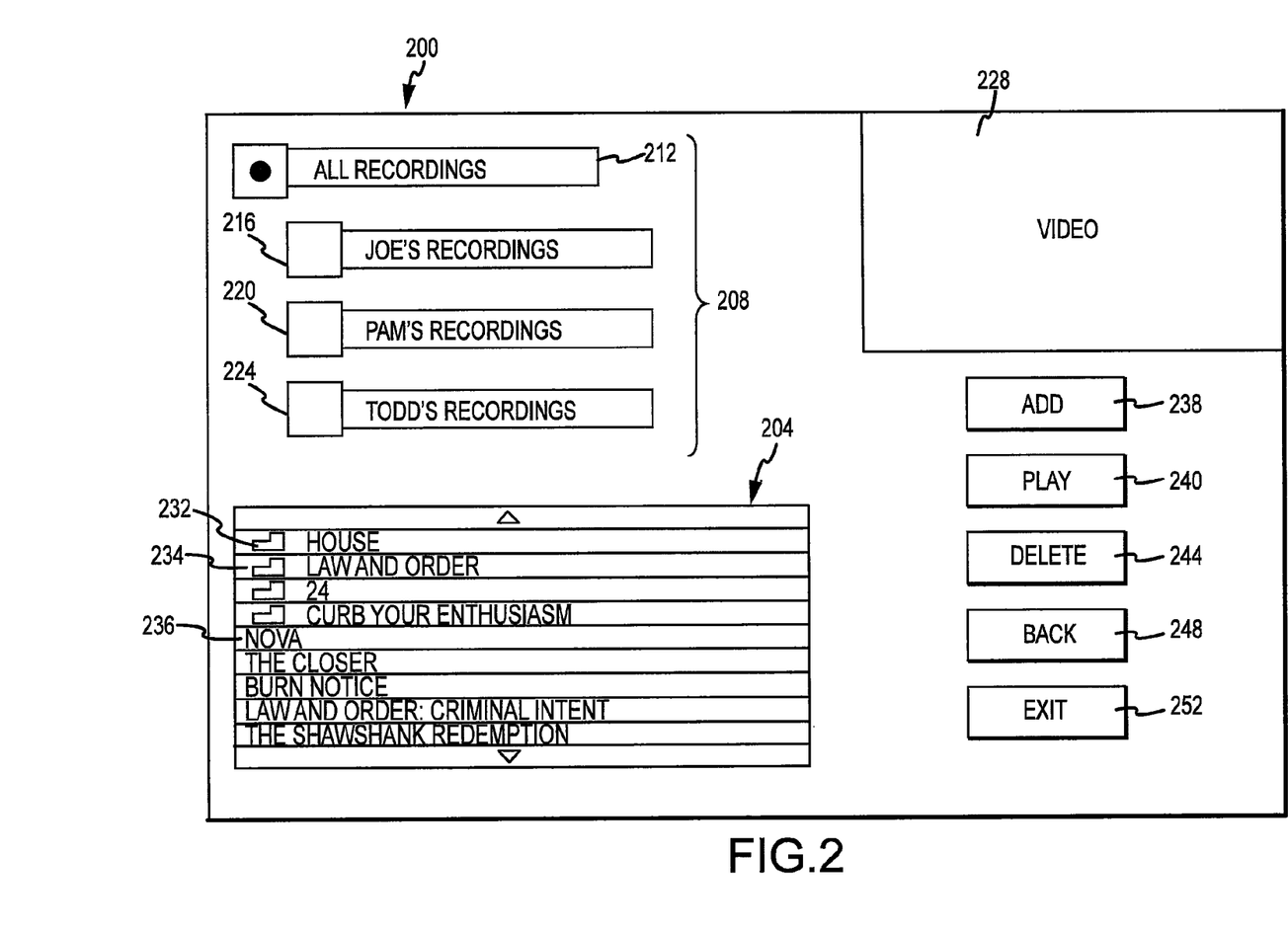
FIG. 2 is a screen shot of a graphical user interface that may be displayed on the display shown in FIG. 1.

FIG. 2 shows a screen shot of the display 144. The screenshot shown in FIG. 2 is a graphical user interface ("GUI") display 200. The GUI 200 may be activated or recalled by a user command entered through the input device 156. The GUI 200 may be used to select recordings that are stored on the storage device 164. The recordings may be stored in the storage device 164 through the operation of the recorder 160. Specifically, the recorder 160 may record one or more programs which are received through the satellite dish 120 at the receiver 108 through the operation of the tuner 124 and decoder 128. The GUI 200 may include a recording listing 204. The recording listing 204 includes titles or other information for recordings stored in the storage device 164. By way of example and not limitation, the recordings listing 204 shown in FIG. 2 include such programs as "Nova" and "The Closer." The recording listing 204 may be provided in association with a recording group selection menu 208. The recording group selection menu 208 may allow the user to select certain menu items, and to thereby control which recordings are displayed in the recording listing 204. In one embodiment, the recording group selection menu 208 includes an "all recordings" menu item 212. If the "all recordings" menu item 212 is selected, the recordings listing 204 displays titles for all recordings stored in the storage device 164. The recording group selection menu 208 may additionally include a number of individual menu items associated with particular users of the receiver 108. By way of example and not limitation, the recording group selection menu 208 shown in FIG. 2 includes a first user menu item 216, a second user menu item 220, and a third user menu item 224. The individual user menu items may be selected to display certain recordings that are associated with a particular user of the receiver 108. The GUI display 200 may additionally include a video window 228. The video window 228 may be used to display a scaled version of a live or other currently viewed video program.

The video listing 204 may include a folder structure that organizes the recordings stored on the storage device 164. A particular folder may be used to contain a number of related recordings. By way of example and not limitation, related recordings may be those recordings that are different episodes of the same television series. For example, in FIG. 2, the recording listing 204 includes a folder 332 that contains a number of programs in the series "House." Programs or other recordings that are not related to other programs stored on the storage device 164 may be listed individually on the recordings listing 204. By way of example and not limitation, the recording listing 204 includes an individual recording 336 of the program "Nova." A user may use the input device 156 to select a particular folder.

Figure 3:
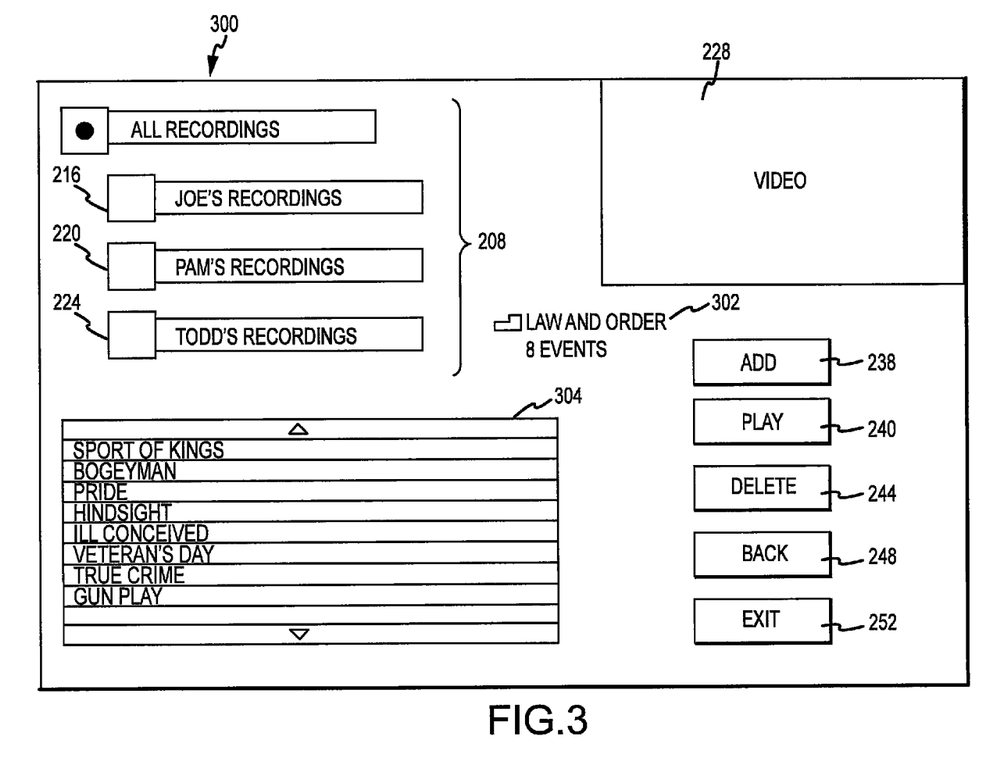
FIG. 3 is a screen shot of another graphical user interface that may be displayed on the display shown in FIG. 1.

In response to a selection of a particular folder, the graphical user interface may display a listing of those videos stored in the folder. An example of a listing of recording contained in a folder is given in FIG. 3. FIG. 3 shows a GUI 300 that displays a subset of all videos available on the recording device 164. Like the GUI 200 shown in FIG. 2, the GUI 300 shown in FIG. 3 includes a recording group selection menu 208 and a video window 228. Additionally, the GUI 300 includes a folder identifier 304. The folder identifier 304 identifies one of the folders such as those shown in video listing 204. The folder identified by folder identifier 302 includes a number of programs or recordings which are listed by title in the recording listing 304. The programs listed in the program listing 304 may be identified by an episode title. Listing recordings by episode title may be used in connection with folders which include recordings of a number of programs in the same series.

Figure 4:
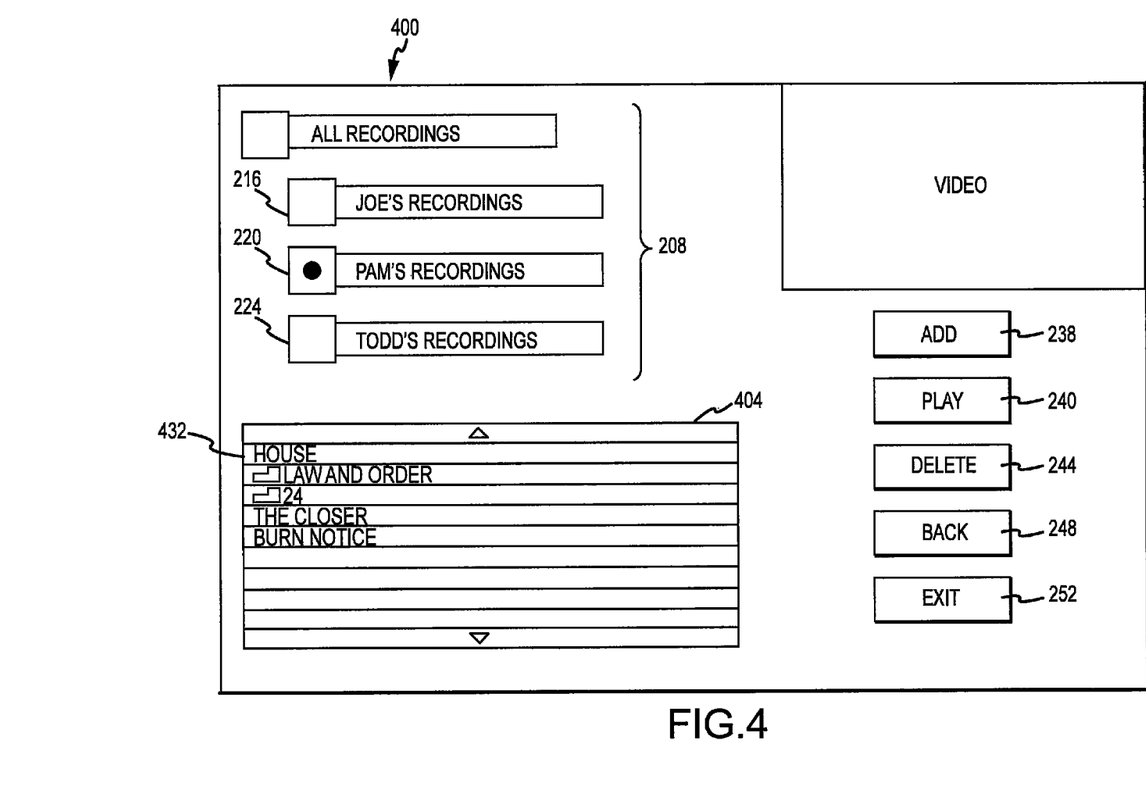
FIG. 4 is a screen shot of another graphical user interface which may be displayed on the display shown in FIG. 1.

Turning now to FIG. 4, a GUI display is generally identified with reference number 400. The GUI 400 includes a recording selection menu 208. The recording selection menu 208 shown in FIG. 4 indicates that the second user menu item 200 has been selected by a user. In accordance with a selection of the second user menu item 220, the recording listing 404 includes a group of programs that are associated with the second user. The individual recordings listed in recording listing 400 may be included in the group based on a user input from the second user. When the second user has finished watching a particular program, the second user may delete this program from her listing of programs. This deleting of a particular recording from a particular user's group of recordings may not necessarily result in the recording being permanently erased from the storage device 164. Specifically, it may be the case that this program has not yet been viewed by other users. The fact that the program has not been viewed by other users may be indicated by this program appearing on one or more other user program group listings. If, when the second user deletes a particular program from the recording listing 404, it is the case that the particular program is not listed in other user's groups of programs, then the deleted program may be permanently erased by removing the program from the storage device 164.

The GUI 400 shown in FIG. 4 includes a number of programs associated with the second user. The programs associated with the second user may be a subset of all of those programs that are stored on the storage device 164. By way of example, the second user's recording listing includes the programs "The Closer" and "Burn Notice" and does not include the programs "Nova" and "Law and Order: Criminal Intent." A particular recording such as "Nova" may not be included on the recording listing 204 for a number of reasons. In one instance, the second user may have watched the program "Nova" and deleted this listing from her recording listing 404. Alternatively, the second user may have not watched the program "Nova," but may have indicated at some point that the program "Nova" should not be included in her recording listing 404. It is also noted that some folders which appear in the recording listing 204 may not appear in an individual recording listing, such as recording listing 404. By way of example and not limitation, the recording listing 404 does not include a folder for the "House" listing 432. Accordingly, it may be the case that the second user has watched all but one episode of the series "House." Accordingly, no folder is needed to store multiple episodes of this particular series.

Figure 5:
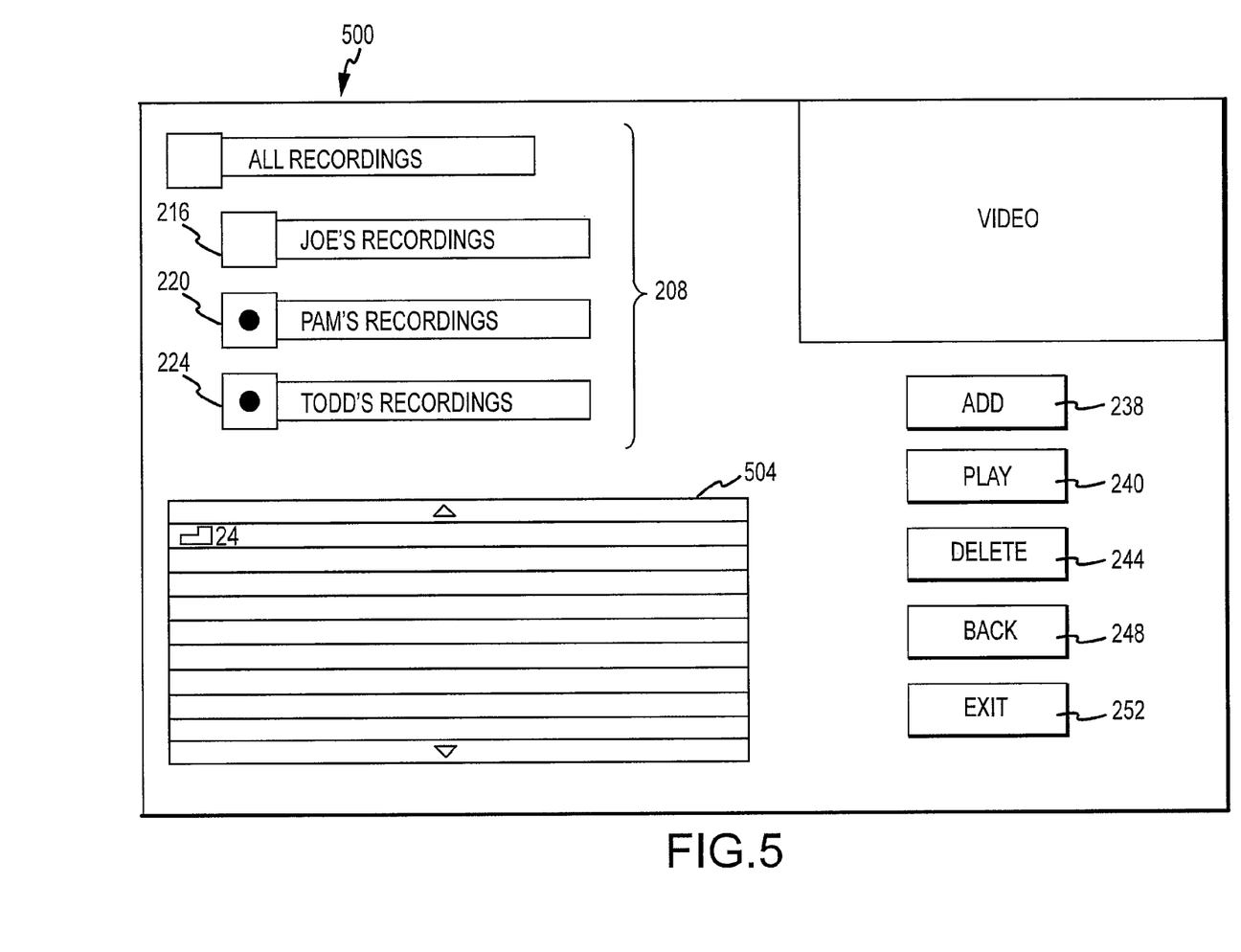
FIG. 5 is a screen shot of another graphical user interface which may be displayed on the display shown in FIG. 1.

Turning now to FIG. 5, a GUI display is generally identified with reference number 500. In GUI 500, the recording group selection menu 208 includes two selected user menu items. By way of example and not limitation, in FIG. 5 the second user menu item 220 and the third user menu item 224 are selected. In accordance with the selections indicated in the recording group selection menu 208, the video listing 504 may include a subset of those recordings that are stored on the storage device 164. Specifically, the recording listing 504 may list those programs or recordings that are in both the second user's group of recordings and the third user's group of recordings. By selecting both the second user menu item 220 and the third user menu item 224, one or more programs may be found which are common to both the second and the third user. This may be useful if the second and the third user sit down to watch television together. By selecting their respective menu items, one or more programs may be displayed that each of the two users wishes to watch and/or has not yet watched. Accordingly, in the embodiment shown in FIG. 5, for a recording to be displayed in the recording listing 504, that recording must be in both the second user's group of programs and in the third user's group of programs. By way of example and not limitation, the recording listing 504 shown in FIG. 5 includes a folder containing a number of episodes for the program called "24." The program "24" may be listed in the recording listing 504 because both the first and the second user have these programs in their individual program groups. Another program such as the "Curb Your Enthusiasm" program may not be listed in the listing of programs 504 due to the fact that this program is not included in the second user's group of recordings. In accordance with an alternative embodiment, for a recording to be displayed in the recording listing 504, that recording must be in either the second user's group of programs or in the third user's group of programs. In this way, the recording listing 504 includes a listing of recording that are to be watched by either the second user or the third user.

Figure 6:
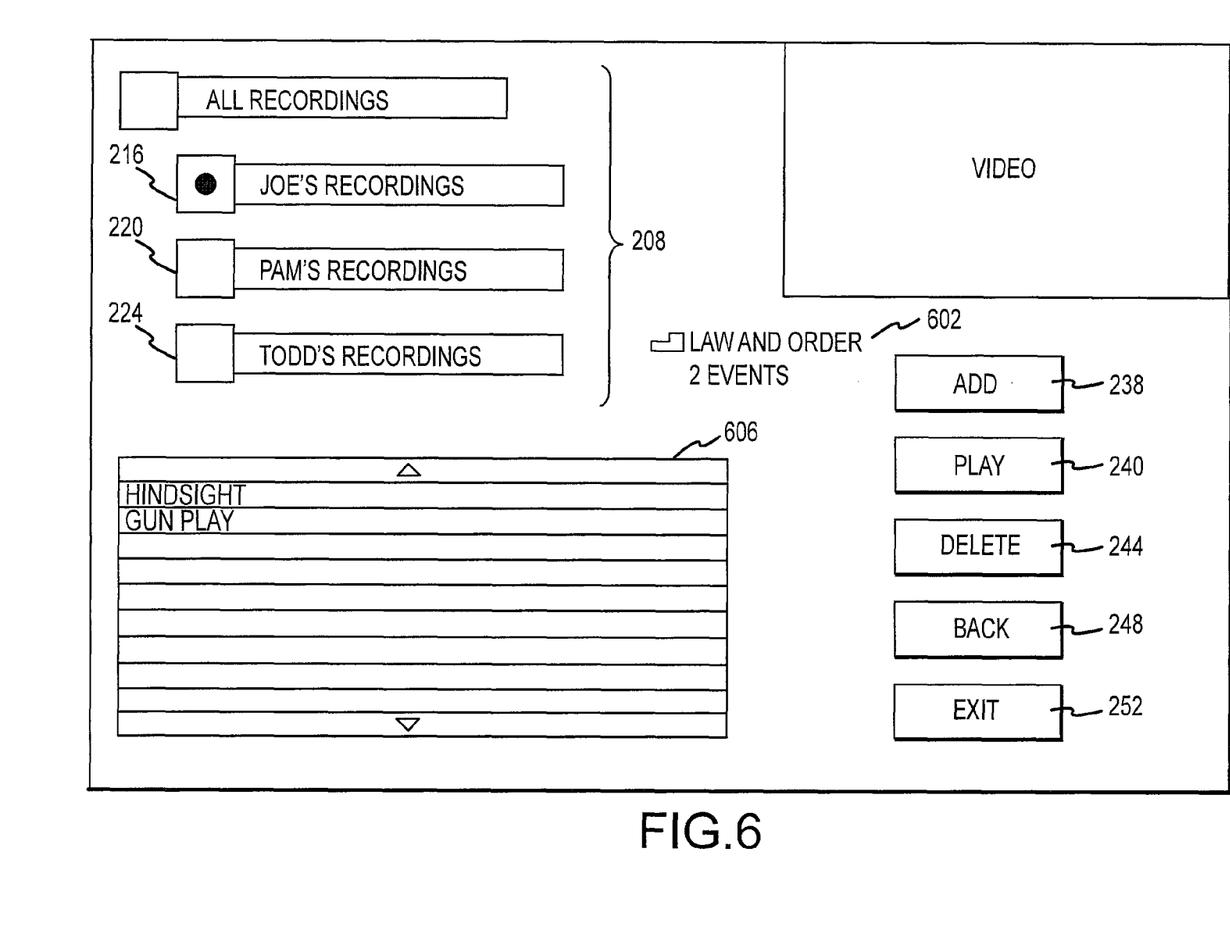
FIG. 6 is a screen shot of another graphical user interface which may be displayed on the display shown in FIG. 1.

Turning now to FIG. 6, a GUI display is generally identified with reference number 600. In the GUI 600, the recording group selection menu 208 indicates that the first user menu item 216 is selected. Accordingly, the recordings listing 604 includes a subset of those recordings stored on the storages device 164. The subset of recordings listed in recordings listing 604 correspond to those recordings which are in the group of recordings associated with the first user. The recordings listed in recording listing 608, may be further limited by a folder indicator 602. Specifically, the folder indicator 602 indicates that the first user has selected a particular folder. By way of example and not limitation, the GUI display 600 indicates that the user has selected the "Law and Order" folder. Accordingly, the recording listing 606 may include those recordings that are both in the "Law and Order" folder and which are associated with the first user. By way of example and not limitation, the recording listing 606 shows that the first user is associated with two episodes of the series "Law and Order." The remaining episodes of "Law and Order," which would otherwise be stored in the folder, may have been deleted from the first user's group of recordings.

The various groups of recordings associated with particular users may be managed by data structures which are stored in the storage device 164. The data structures 172 may include an entry for each user, the entry including a listing of chosen titles. The titles may be some or all of the recordings that are stored on the storage device 164. A particular recording may be added or deleted from a particular user's list of recordings as he or she watches the recording. In some embodiments, once a particular recording no longer is included in any particular user group of recordings, that recording may be permanently erased by erasing the recording from the storage device 164. In some embodiments the recording may be automatically erased from the storage device 148. In other embodiments, once the recording has been removed from the last user's list, a pop up or prompt may be displayed asking the user if the recording should be permanently deleted by erasing the recording from the storage device 164.

Referring to FIG. 2 through FIG. 6, a particular graphical user interface may include a number of buttons which are operable to implement various functions. For example, a graphical user interface may include an add button 238 which, when selected by a user, causes a particular program to be added to a particular user list of programs. The add button 238 may be used to add a recording that is on a first user list of recordings to a second user list of recordings. For example, if a particular recording to associated with a first user and not a second user, the add button 238 may be used to associate the recording with the second user. In one embodiment, the recording may be selected in a menu that includes programs associated with the first user. The add button 238 may then be selected. In response to the add button 238 being selected, a pop-up window or other prompt may be displayed on the display 144 that allows the user to specify a certain user with which the recording is to be associated. In this menu, the second user may be selected to thereby add the recording to list group of recordings associated with the second user.

A graphical user interface may also include a play button 240 which, when selected by a user, causes a particular program to be played. A graphical user interface may include a delete button 244 which, when selected by a user, causes a particular program to be deleted. Pressing the delete button 244 may cause the program to be deleted from one or more user lists of programs depending on the selections made in the recording group selection menu 208. Alternatively, a prompt or a pop up menu may be provided when the user selects the delete button. The prompt may ask the user to specify from which user list of programs should the program be deleted. A graphical user interface may include a back button 248, which when pressed by a user causes the previously displayed graphical user interface to be displayed. Additionally, a graphical user interface may include an exit button 252 which, when pressed by a user, causes the graphical user interface to exit and a live or recorded video to be displayed on the entirety of the display 144.

Figure 7:
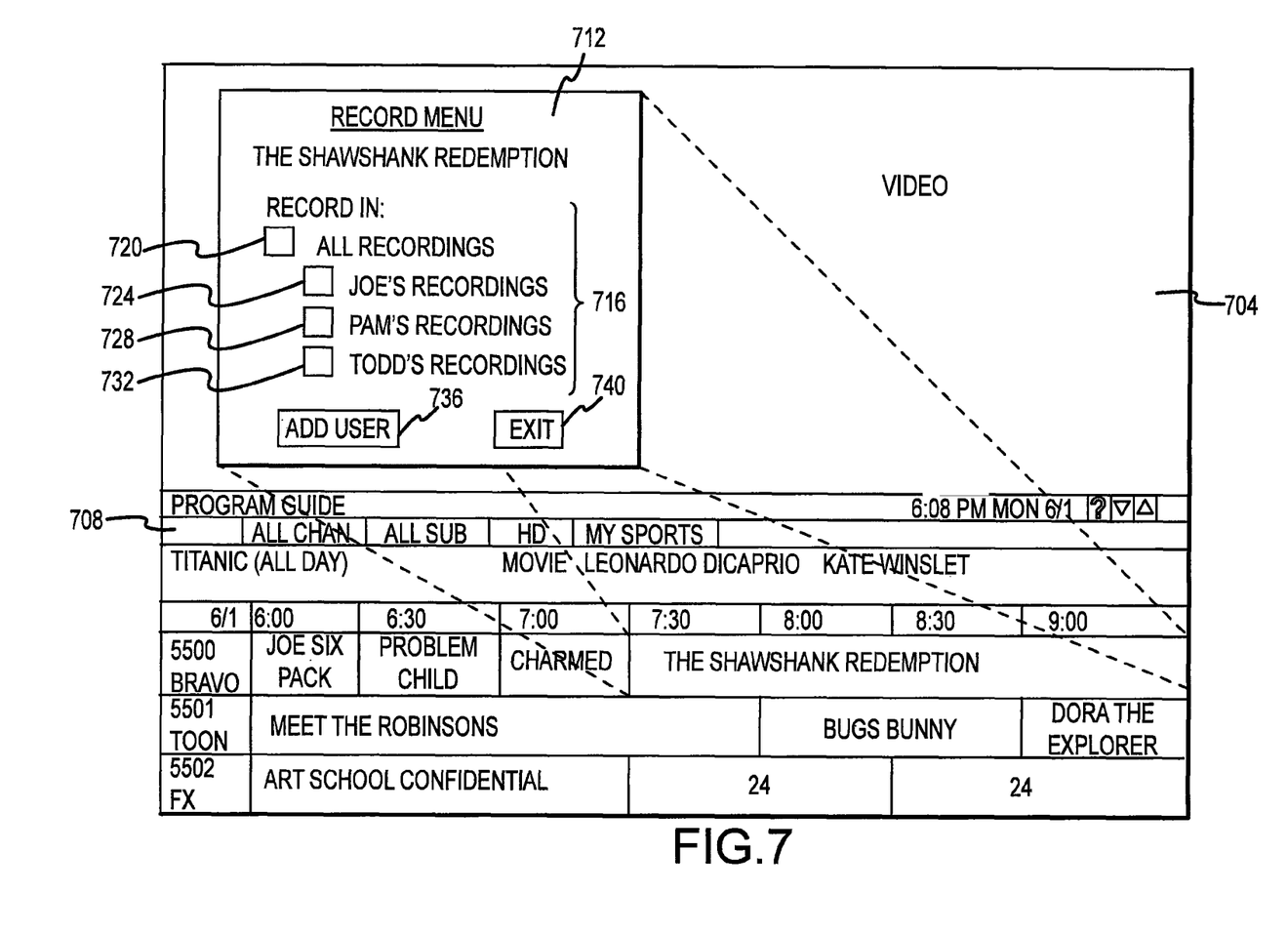
FIG. 7 is a screen shot of an electronic programming guide grid and a recording menu which may be displayed on the display shown in FIG. 1.

In accordance with implementations discussed herein, a particular recording may be added to one or more user groups when a command is entered to record the particular video. An example of a graphical user interface which affects this recording process is illustrated in FIG. 7. FIG. 7 shows a screen shot of a display 144 which includes a portion of the screen 144 dedicated to showing a live video 704. In addition to live video 704, the screen shot includes an EPG grid 708. The EPG grid 708 may be displayed or recalled by a command entered by the user through the user input device 156. The EPG grid 708 includes a schedule of programs organized by a number of channels which are listed in the rows of the EPG grid 708. Particular programs which occur on a given channel are sequentially listed by time slots that are arranged in columns of the EPG grid 708. Through a command entered through the user input device 156, a user may select a particular program listed in the EPG grid 708. By selecting the particular program, the user may specify that the program is to be recorded by the recorder 160. In response to a record command, the recording management module 168 may display a pop up or other prompt that allows a user to enter information in connection with the recording. By way of example and not limitation, in FIG. 7 a user selects the movie "The Shawshank Redemption" to be recorded. In response, the recording management module displays a record menu 712. The record menu 712 may include a recording options menu 716. The recording options menu 716 may include an "all recordings" menu item 720. If a user selects the "all recordings" menu item 720, the recording may be listed in all user's groups of recording. Additionally, the recording options menu 716 may include a number of individual user menu items. By way of example and not limitation, the recording options menu 716 shown in FIG. 7 includes a first user menu item 720, a second user menu item 724, and a third user menu item 728. In connection with recording a particular program, one or more of the individual user menu items may be selected to include the recording in recording list or lists associated with the selected users. Additionally, the recording menu 712 may include a button or other mechanism that allows a user to enter the name of a new user. Additionally, the recording menu 712 may include an exit button 740.

Figure 8:
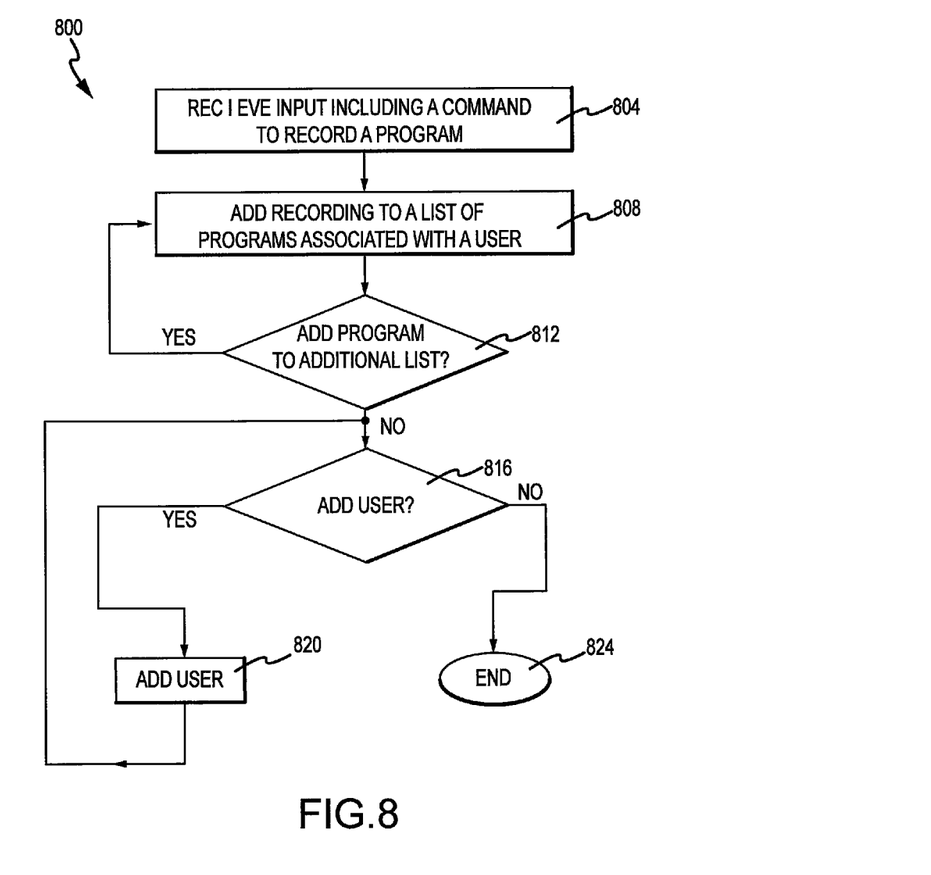
FIG. 8 is a flowchart illustrating a method in accordance with implementations discussed herein.

Turning now to FIG. 8, a flowchart is generally identified with reference number 800. The flowchart 800 illustrates a method in accordance with embodiments discussed herein. The method illustrated in FIG. 8 may be implemented in connection with a command to record a particular program. The method shown in FIG. 8 may operate to cause the program to be associated with one or more different users of a receiver 108.

Initially, at operation 804, the receiver 108 receives input from an input device 156. The input received in operation 804 may include a command to record a particular program. The command may be entered through the input device 156 in connection with a user interaction with an EPG grid 708. Following operation 804 operation 808 may be executed.

In operation 808, the recording management module 168 adds the recording to a list of recordings associated with a particular user. This may include storing the title or other data in a data structure entry which corresponds to a particular user. Following operation 808, operation 812 may be executed.

In operation 812, a user may be prompted to indicate whether or not the recording should be added to an additional list associated with a different user. Operation 812 may include displaying pop ups or other prompts on a display 144. If it is determined that the program is to be added to an additional list, operation 808 may be executed after operation 812. As described above, in operation 808 the recording may be added to a particular list associated with a particular user. If, in operation 812, it is determined that the program is not to be added to further user lists of programs, operation 816 may be executed.

It may be the case that, in connection with recording a particular program, a user wishes to add himself or others to the list of users associated with the receiver 108. Accordingly, in operation 816, a determination may be made, as to whether an additional user is to be added to the receiver 108. Operation 816 may include prompting the user through a pop up menu or other graphical user interface on display device 144. If, in operation 816, it is determined that an additional user is to be added to the receiver 108, operation 820 may be executed. In operation 820, a user account or other entry may be added to the group of users associated with the receiver 108. Following operation 820, operation 816 may again be executed. In operation 816, the display management module 168 may determine if another user is to be added to the receiver 108. In operation 816, if it is determined that no further users are to be added to receiver 108, the method may end in operation 824.

Figure 9:
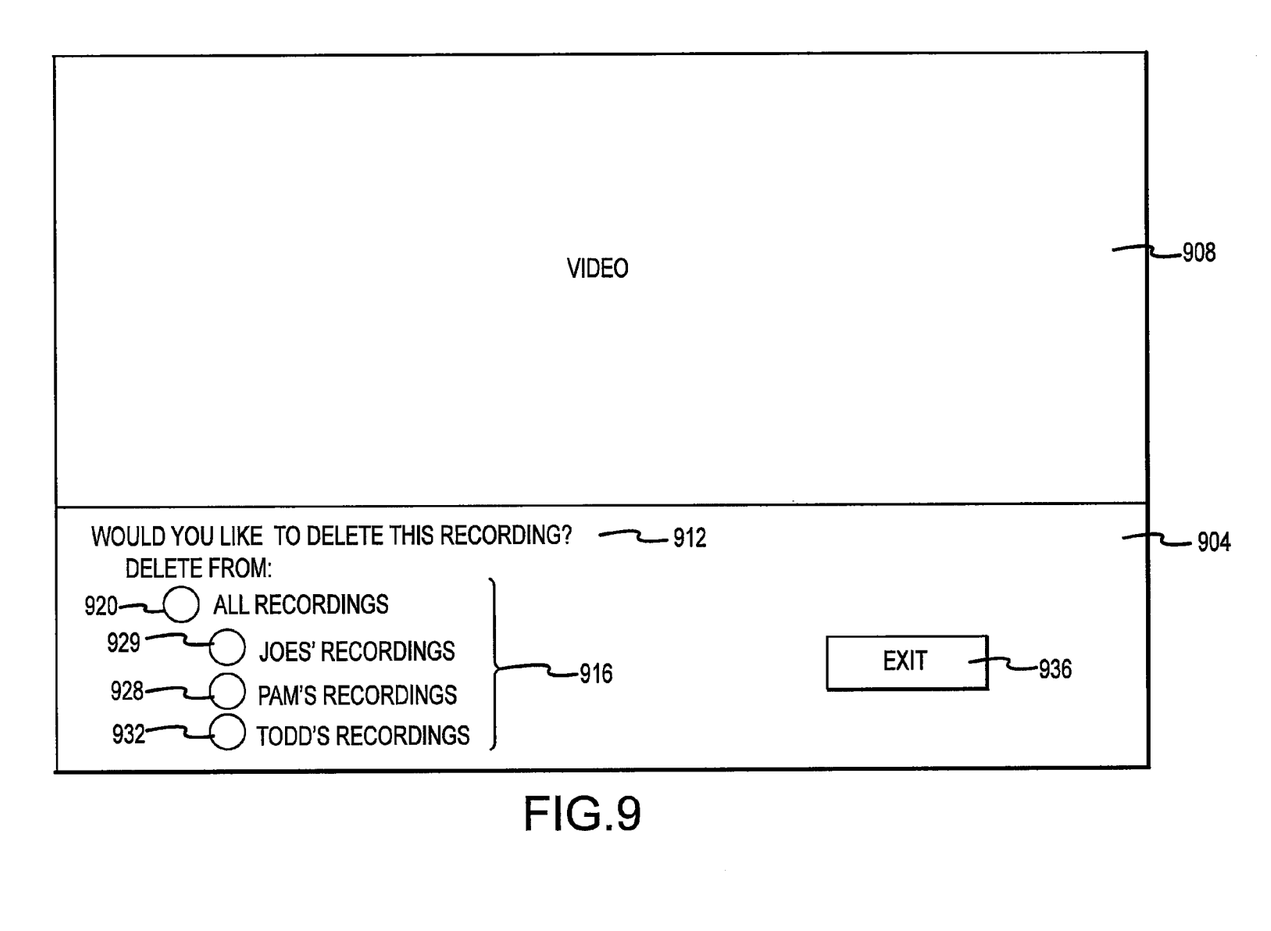
FIG. 9 is a screen shot of a pop up menu which may be displayed on the display shown in FIG. 1.

Once a video is displayed on the display 144, the display management module 168 may determine if the recording is to be deleted from one or more user lists. FIG. 9 shows an example of a graphical user interface used to determine from which user list or lists a particular recording should be deleted. Generally, FIG. 9 is a screen shot of the display 144 which may occur at the conclusion of a video or recording. The screen shot shown in FIG. 9 includes a pop up or other menu 904, which may be displayed on the display 908. The pop up 904 may include a question such as "would you like to delete this recording?" 912, presented to a user at the conclusion of the recording. Additionally, the pop up menu 904 may include a delete menu 916. The delete menu 916 may include an "all recordings" menu item 920. Selecting the "all recordings" menu item 920 causes the recording management module 168 to delete the recording from all user lists. Additionally, as the recording is deleted from all user lists, the recording is erased from the storage device 164. The delete options menu 916 may additionally include a number of individual user list delete options. By way of example and not limitation, the pop up menu 904 shown in FIG. 9 includes a first user delete menu item 924, a second user delete menu item 928, and a third user delete menu item 932. Selecting one or more of these individual user menu items may cause the recording management module 148 to delete the recording from the appropriate user list of programs. If it is the case that after deletions are specified by a user, the program still remains on at least one list, the recording management module 168 will not erase the program from the storage device 164.

Figure 10:
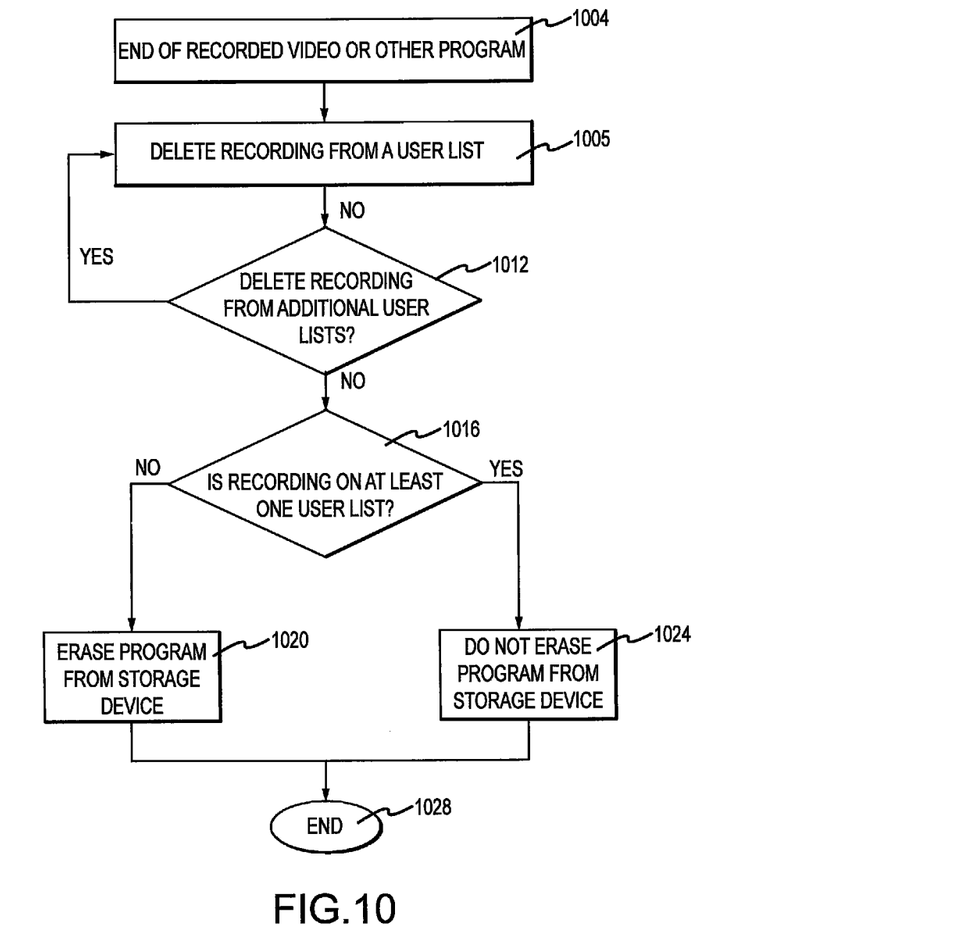
FIG. 10 is a flowchart illustrating another method in accordance with implementations discussed herein.

FIG. 10 is a flowchart 1000 that illustrates a method in accordance with embodiments discussed herein. The flowchart 1000 illustrates a process or method of deleting a program from one or more user lists at a conclusion of a recorded video or other program. Initially, at operation 1004, an end of a recorded video or other program is encountered. Following operation 1004, operation 1008 may be executed. In operation 1008, the recording is deleted from a user list. Deleting the recording may be affected by the recording management module 168. In response to user input provided through a graphical user interface, such as the pop up menu 904 shown in FIG. 9. Following operation 1008, operation 1012 may be executed. In operation 1012, a determination is made as to whether the recording should be deleted from an additional user list. If in operation 1012 if it is determined that the recording should be deleted from an additional user list, operation 1008 may again be executed. In operation 1008, as described above, the recording is deleted from a particular user list. In operation 1012, if it is determined that the recording is not to be deleted from additional user lists, operation 1016 may be executed. In operation 1016, a determination is made as to whether the recording is in at least one user list associated with the receiver 168. Operation 1016 may be affected by the recording management module 168 which inspects the data structures 172 stored in the data storage 164 to determine the presence of the program in at least one data structure entry. If, in operation 1016, it is determined that the recording is on at least one user list, operation 1024 may be executed. In operation 1024, the recording is not erased from the storage device. If, in operation 1016 it is determined that the recording is not in any user list, operation 1020 may follow. In operation 1020, the program may be erased permanently from the storage device 164. In certain embodiments, operation 1020 may include prompting or otherwise asking the user through a graphical user interface to confirm that the program should be deleted or erased permanently from the storage device. Following operations 1020 and 1024, the method may end at operation 1028.

The foregoing merely illustrates certain principles of embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention

The invention claimed is:

1. In a receiver having at least a processor, a signal receiver and an output, a method of recording programs received from a program service transmission, the method comprising:

receiving a first input through a signal receiver, the first input including a command to record a program from a program service transmission;

receiving a second input through the signal receiver, the second input including a command to at least include the program in a first group of programs, the first group of programs being associated with a first user, the first user being one of a number of users associated with the receiver;

in response to the first input, recording the program by a recorder when the program occurs, wherein the program is stored on a storage device as a recorded program;

in response to the second input, adding, by a processor, the stored program to a first data set stored in the storage device, the first data set including all programs stored in the storage device that are in the first group, wherein the storage device includes at least a second data set and a third data set, the second data set including all programs stored in the storage device that are in a second group associated with a second user, the second data set not including the stored program, the third data set including all programs stored in the storage device that are in a third group associated with a third user;

receiving a third input through the signal receiver, the third input selecting a first selectable icon on a user interface, the first icon being associated with only one user, which is the first user;

in response to the third input, outputting a signal comprising the first data set in a data stream for display on an output device, wherein the signal causes the output device to display a listing of the first group of programs;

receiving a fourth input from a single user through the signal receiver, the fourth input selecting the first selectable icon and selecting a second selectable icon on the user interface, the second icon being associated with only one user, which is the third user; and in response to the fourth input, outputting a signal comprising data that are common to the first data set and the third data set, in a data stream for display on an output device, wherein the signal causes the output device to display a listing of programs that are in the first group of programs and also in the third group of programs.

2. The method of claim 1, further comprising:

outputting a program signal to the output device, the program signal configured to cause the output device to display the stored program; and following a conclusion of the program, deleting the program from the first data set.

3. The method of claim 2, wherein following the operation of deleting the program, no user associated with the receiver has a corresponding group that includes the program, the method further comprising:

erasing the program from the storage device.

4. The method of claim 1, wherein the second input includes a command to at least include the program in the third group of programs, the method further comprising:

in further response to the second input, adding, by a processor, the stored program to the third data set stored in the storage device.

5. The method of claim 4, further comprising:
outputting a program signal to the output device, the program signal configured to cause the output device to display the stored program; and
following a conclusion of program, erasing the program from the first data set and the third data set.

6. The method of claim 1, further comprising:
in response to receiving the first input, outputting a signal to the output device, the signal configured to cause the output device to display a graphical user interface having at least a selectable icon for the first user and a selectable icon for the second user, wherein a selection of at least one selectable icon causes the recorder to associate the program to a data set associated with a corresponding user.

7. The method of claim 1, further comprising:
outputting a program signal to the output device, the program signal configured to cause the output device to display the stored program; and
following a conclusion of the program, outputting a graphical user interface signal to the output device, the graphical user interface signal configured to cause the output device to display a graphical user interface that includes a plurality of selectable icons, each of the plurality of selectable icons representing each user that is associated with the receiver,
wherein a selection of particular selectable icon associated with a user causes the recorder to delete the program from the group associated with the user.

8. The method of claim 1, wherein at least two recorded programs stored on the storage device are contained in a folder, the method further comprising:
receiving a fifth input selecting the folder;
wherein the listing of the first group of programs includes only programs that are contained in the folder.

9. In a receiver having at least a processor, a signal receiver and an output, a method of recording programs received from a program service transmission, the method comprising:
receiving a first input through the signal receiver, the first input requesting a graphical user interface;
in response to the first input, outputting a first graphical user interface signal to an output device, the first graphical user interface signal configured to cause the output device to display a first graphical user interface having at least a selectable icon for a first user and a selectable icon for a second user, the selectable icon for the first user being associated with only one user, which is the first user and the selectable icon for the second user being associated with only one user, which is the second user;
receiving a second input from a single user through the signal receiver, the second input selecting both, from the first graphical user interface, the icon for the first user and the icon for the second user;
in response to the second input, outputting a program listing signal comprising a data set common to a first data set and a second data set in a data stream for display on the output device, wherein the program listing signal causes the output device to display a listing of programs that are in a first group of programs and also in a second group of programs, the first group of programs being associated with the first user and the second group of programs being associated with the second user, wherein the first data set includes all programs that are in the first group of programs and the second data set includes all programs that are in the second group of programs, and the first data set and the second data set are stored in a storage device; and
following the conclusion of the program, outputting a second graphical user interface signal to the output device, the second graphical user interface signal configured to cause the output device to display a second graphical user interface that includes a first selectable icon for the first user and a second selectable icon for the second user, the first user being associated with the first group of programs and the second user being associated with the second group of programs, wherein a selection of one of the first selectable icon or the second selectable icon causes the recorder to delete the program from the associated group of programs.

10. The method of claim 9, further comprising:
outputting a program signal to the output device, the program signal configured to cause the output device to display a program stored in the storage device; and
following a conclusion of the program deleting the program from the first data set.

11. The method of claim 10, further comprising:
following the conclusion of program, deleting the program from the second data set, wherein following the operation of deleting the program, no user associated with the receiver has a corresponding group that includes the program; and
deleting the program from the storage device.

12. The method of claim 9, wherein at least two programs stored on the storage device are contained in a folder, the method further comprising:
receiving a third input selecting the folder;
wherein the listing of programs includes those programs that are contained in the folder and are in the first group of programs and also in the second group of programs.

13. A system for managing programs recorded from a program service transmission, the system comprising:
a receiver for receiving a program service transmission, the program service transmission includes a plurality of programs;
a storage device interconnected with the receiver, the storage device configured to store programs recorded from the program service transmission as stored programs;
a plurality of data structures stored on the storage device, each data structure containing a list of programs stored on the storage device that are associated with a particular user, the plurality of data structures including at least a first data set, the first data set includes all programs stored in the storage device that are in a first group associated with a first user, and a second data set, the second data set includes all programs stored in the storage device that are in a second group associated with a second user;
a processor coupled to the storage device, the processor configured to receive an input from a single user; and
an output device interconnected with the receiver and configured to display the programs stored in the storage device,
wherein the input from the single user being a selection of both a first selectable icon on a graphical user interface and a second selectable icon on the graphical user interface, the first selectable icon associated with only one user, which is the first user and the second selectable icon associated with only one user, which is the second user, and
wherein the processor is further configured, upon receiving the input from the user, to cause the output device to display, on the graphical user interface, a listing of programs corresponding to data common to the first data set and the second data set, the listing of programs includes programs that are in the first group and also in the second group.

14. The system of claim 13, wherein the output device is further configured to display a graphical user interface, the graphical user interface comprising a listing of programs that are in a folder and are in the first group of programs and also in the second group of programs.

15. The system of claim 13, wherein if a first program is deleted from each of the plurality of data structures, the first program is erased from the storage device.

* * * * *